(12) United States Patent
Brock et al.

(10) Patent No.: US 10,225,910 B2
(45) Date of Patent: Mar. 5, 2019

(54) SYSTEMS AND METHODS FOR GLARE-FREE ADAPTIVE LIGHTING

(71) Applicants: Lori Brock, Ipswich, MA (US); Michael Quilici, Essex, MA (US)

(72) Inventors: Lori Brock, Ipswich, MA (US); Michael Quilici, Essex, MA (US)

(73) Assignee: OSRAM SYLVANIA Inc., Wilmington, MA (US)

(*) Notice: Subject to any disclaimer, the term of this patent is extended or adjusted under 35 U.S.C. 154(b) by 0 days.

(21) Appl. No.: 15/587,982

(22) Filed: May 5, 2017

(65) Prior Publication Data
US 2018/0324929 A1 Nov. 8, 2018

(51) Int. Cl.
H05B 33/00 (2006.01)
H05B 37/02 (2006.01)
H05B 33/08 (2006.01)
F21V 14/04 (2006.01)
F21Y 115/10 (2016.01)
F21Y 115/30 (2016.01)

(52) U.S. Cl.
CPC ......... *H05B 37/0227* (2013.01); *F21V 14/04* (2013.01); *H05B 33/0854* (2013.01); *F21Y 2115/10* (2016.08); *F21Y 2115/30* (2016.08)

(58) Field of Classification Search
CPC .... B60K 2350/1024; B60K 2350/1028; B60K 35/00; B60K 37/06; B60K 2350/1044; B60K 2350/106; B60K 2350/2013; B60K 2350/2034; B60K 2350/2039; B60K 2350/2052; B60K 2350/2095; B60K 2350/352
See application file for complete search history.

(56) References Cited

U.S. PATENT DOCUMENTS 9,191,634 B2 * 11/2015 Schofield ........... G06K 9/00818
2014/0320023 A1 10/2014 Cannon et al.
2015/0145698 A1 5/2015 Werner et al.
2016/0150614 A1 5/2016 Randolph

FOREIGN PATENT DOCUMENTS

DE   102016203164 A1   12/2016

OTHER PUBLICATIONS

Micromirror Device, Wikipedia, available at https://en.wikipedia.org/wiki/Micromirror_device (last accessed Feb. 16, 2017).
(Continued)

*Primary Examiner* — Monica C King
(74) *Attorney, Agent, or Firm* — Yutian Ling

(57) ABSTRACT

Techniques are disclosed to operate a luminaire so as to reduce glare experience by an occupant within an area illuminated by a luminaire. The luminaire includes individually operated light sources. An image capture device is deployed for capturing an image of an area. Operatively coupled to the luminaire and the image capture device is a computing system. The computing is configured to reduce glare by adjusting a light intensity of a light source of the luminaire. These adjustments are based on, for example, a position of an occupant within the area and a direction in which the occupant is facing relative to the luminaire, and/or a position of an indirect glare source.

16 Claims, 4 Drawing Sheets

(56) References Cited

OTHER PUBLICATIONS

"Face Detection using Haar Cascades," OpenCV 3.2.0-dev, available at http://docs.opencv.org/trunk/d7/d8b/tutorial_py_face_detection.html (last accessed Apr. 6, 2017).
Digital Micromirror Device, Wikipedia, available at https://en.wikipedia.org/wiki/digital_micromirror_device (last accessed Feb. 16, 2017).
"Matrix Light—Automotive Product of the Year 2014 by the Elektronik trade journal," Osram Press Release, Sep. 4, 2014, available at http://www.osram.co.uk/osram_uk/news-and-knowledge/news/automotive/2014/matrix-led---automotive-product-of-the-year-2014-by-the-elektronik-trade-journal-/index.jsp (last accessed Apr. 6, 2017).
DiLouie, Craig, "How to Reduce Glare," IES Light Logic, available at http://ieslightlogic.org/how-to-reduce-glare/ (last accessed Feb. 13, 2017).
Computer Vision, Wikipedia, available at https://en.wikipedia.org/wiki/Computer_vision (last accessed Feb. 23, 2017).
"µAFS LED headlights," Trends in Automotive Lighting, Osram, available at https://www.osram.com/automotive/specials/trends-in-automotive-lighting/%C2%B5afs-led-headlights/index.jsp (last accessed Feb. 13, 2017).
"Getting Started with DLP Technology," Texas Instruments, available at http://www.ti.com/lsds/ti/dlp/getting-started.page#how-mirrors-work (last accessed Apr. 6, 2017).
Bush, Steve, "Osram takes matrix headlights to the next level," Electronics Weekly, Oct. 7, 2016, available at http://www.electronicsweekly.com/news/products/led/osram-takes-matrix-headlights-next-level-2016-10/.
Nica, Gabriel, "BMW's 2015 Technologies Reviewed: From Night Vision to LED Headlights," Auto Evolution, May 19, 2015, available at https://www.autoevolution.com/news/bmws-2015-technologies-reviewed-from-night-vision-to-led-headlights-95624.html.
Rosebrock, Adrian, "Pedestrian Detection OpenCV," PyImageSearch, Nov. 9, 2015, available at http://www.pyimagesearch.com/2015/11/09/pedestrian-detection-opencv/.
Morrison, J. et al., "Tip-Tilt-Piston Micromirror with Integrated Large Range Variable Focus for Smart Lighting Systems," Advanced Manufacturing, Electronics and Microsystems: Techconnect Briefs 2015, pp. 300-303, TechConnect.org (2015), ISBN 978-1-4987-4730-1.
Plamann, Tobias, International Search Report and Written Opinion of the International Searching Authority, for counterpart application PCT/US2018/030109, dated Jul. 20, 2018, European Patent Office, Rijswijk, The Netherlands, 11 pages.

\* cited by examiner

SYSTEMS AND METHODS FOR GLARE-FREE ADAPTIVE LIGHTING

FIELD OF THE DISCLOSURE

This disclosure relates to solid-state lighting (SSL) fixtures, and more particularly to luminaires capable of glare-free adaptive lighting.

BACKGROUND

Traditional lighting fixtures, such as those utilized in offices and retail spaces, employ light sources for generating light. These light fixtures reflect or otherwise direct light to illuminate a given area. To adjust their light output, these existing light fixtures can be electronically controlled using mechanical devices, such as a dimmer switch, or digital programmable controllers. In some instances, a user can physically adjust a housing or trim for a given light fixture to redirect the light within the given area.

SUMMARY

One example embodiment of the present disclosure provides a system including a luminaire including a luminaire that includes a plurality of individually controllable light sources to illuminate an area, one or more image capture devices configured to capture an image of the area, and a computing system configured to determine a position of an occupant within the area, determine a direction in which the occupant is facing relative to the luminaire, and adjust a light intensity of at least one of the individually controllable light sources of the luminaire to reduce glare experienced by the occupant based on the determined position of the occupant and the determined direction that the occupant is facing. In some cases, the system includes a plurality of luminaires and at least some of the luminaires includes the one or more image capture devices, and the plurality of luminaires are communicatively coupled to the computing system. In some cases, the luminaire includes a matrix light engine configured to be received within a socket of the luminaire, the matrix light engine including a base, a body portion attached to the base, and a light source module disposed within the base and configured to transmit light to the area using at least one optical element, the light source module including the plurality of individually controllable light sources. In some cases, the luminaire includes at least one optical element and a digital micromirror device that transmit light from at least one of the individually controllable light sources to the area. In some cases, the computing system is further configured to determine a position of an indirect glare source within the area, and adjust a light intensity of at least one of the individually controllable light sources of the luminaire based on the determined position of the indirect glare source to reduce glare experienced by the occupant from the indirect glare source. In some cases, the computing system is further configured to determine one or more individually controllable light sources that transmit light to the determined position of the occupant and in the determined direction that the occupant is facing, and adjust a light intensity of the determined one or more individually controllable light sources to reduce glare experienced by the occupant. In some cases, the computing system is further configured to adjust the light intensity of at least one of the individually controllable light sources of the luminaire based on a light intensity from a source other than the luminaire to reduce glare experienced by the occupant.

Another example embodiment of the present disclosure provides a method for operating a luminaire including receiving an image of an area illuminated by the luminaire, the luminaire including a plurality of light sources, determining a position of an occupant within the area based on the received image, determining a direction that the occupant is facing relative to the luminaire based on the received image, and adjusting a light intensity of at least one light source of the luminaire to reduce glare experienced by the occupant based on the determined position of the occupant and the determined direction that the occupant is facing. In some cases, determining the position of the occupant within the area includes analyzing the image to identify at least one shape within the image that corresponds to an occupant within a previous set of images. In some cases, determining the position of the occupant within the area includes associating a position identifier with each location in the area that receives a light output from a light source of the luminaire, associating each position identifier with at least one pixel of the image, determining a plurality of pixels of the image that corresponds to the occupant, associating the position of the occupant within the area with the at least one light source of the luminaire based on the position identifiers of the plurality of pixels and position identifiers of each of the light sources of the luminaire. In some cases, determining the direction that the occupant is facing relative to the luminaire includes analyzing the image to identify a plurality of pixels that indicates a direction that the occupant is facing based on a set of previous images. In some cases, determining the direction that the occupant is facing relative to the luminaire includes identifying at least one of a feature and an activity for the occupant based on the set of previous images. In some cases, adjusting the light intensity of at least one light source of the luminaire include identifying a light source of the luminaire to be adjusted based on the determined position of the occupant within the area and a position identifier associated with that position, and selecting a light intensity at which to operate the identified light source based on the direction that the occupant is facing relative to the luminaire. In some cases, the method may further include correcting at least one angular coordinate for a light source of the luminaire based on a position of an image capture device relative to the luminaire, in which the image capture device captures the image of the area. In some cases, the method may further include determining a position of an indirect glare source within the area, and adjusting a light intensity of at least one light source of the luminaire to reduce glare experienced by the occupant based on the determined position of the indirect glare source.

Another example embodiment of the present disclosure provides a computer program product including one or more non-transitory machine readable mediums having a plurality of instructions encoded thereon that when executed by one or more processors cause a process to be carried out, the process including determining a position of an occupant within an area illuminated by a luminaire, the luminaire including a plurality of light sources, determining a direction in which an occupant is facing relative to the luminaire, and adjusting a light intensity of at least one of the light sources of the luminaire to reduce glare experienced by the occupant based on the determined position of the occupant and the determined direction that the occupant is facing. In some cases, determining the position of the occupant within the area includes associating a position identifier with each location in the area that receives a light output from a light source of the luminaire, associating each position identifier with at least one pixel of the image, determining a plurality of pixels of the image that corresponds to the occupant, and associating the position of the occupant within the area with the at least one light source of the luminaire based on the position identifiers of the plurality of pixels and position identifiers of each of the light sources of the luminaire. In some cases, adjusting the light intensity of at least one of the light sources of the luminaire includes identifying a light source of the luminaire to be adjusted based on the determined position of the occupant within the area and a position identifier associated with that position, and selecting a light intensity at which to operate the identified light source based on the direction that the occupant is facing relative to the luminaire. In some cases, the process may further include correcting at least one angular coordinate for a light source of the luminaire based on a position of an image capture device relative to the luminaire, in which the image capture device captures the image of the area. In some cases, the process may further include determining a position of an indirect glare source within the area, and adjusting a light intensity of at least one of the light sources of the luminaire to reduce glare experienced by the occupant based on the determined position of the indirect glare source.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
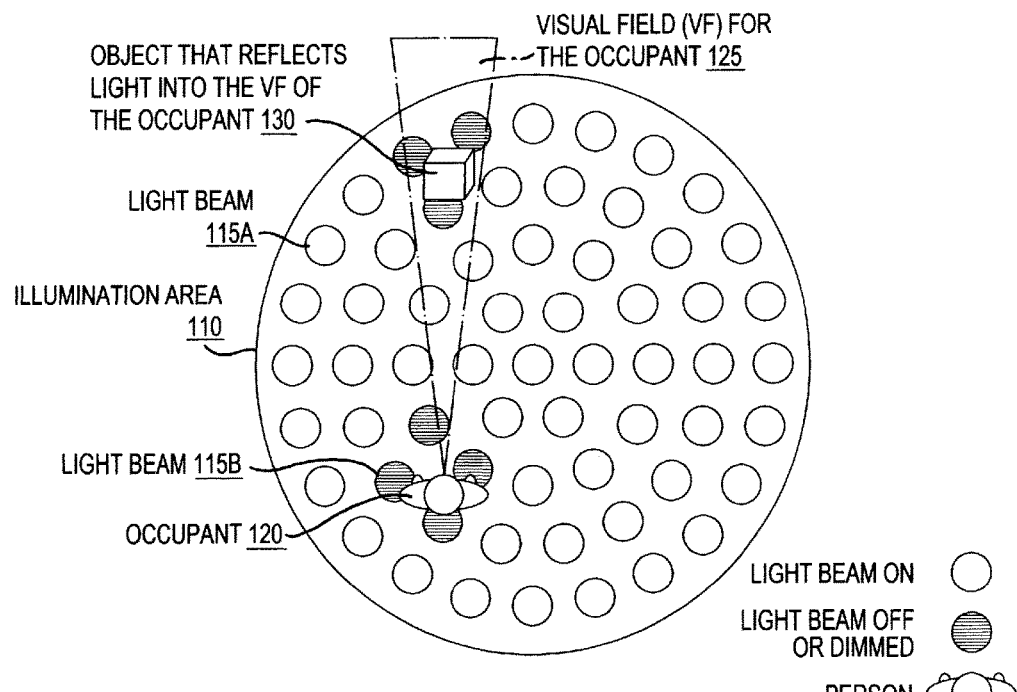
FIG. 1 is a plan view schematic of a pattern of light emitted by a luminaire into an illuminated area, in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques are disclosed for operating a luminaire to reduce glare directed at an occupant. The techniques can be embodied in a lighting control system. The system includes a luminaire including a plurality of individually operated light sources (e.g., light emitting diodes (LEDs) or solid-state lasers) for illuminating an illumination area, and a device to acquire images ("image capture device"). An illumination area is the portion of an area illuminated by the light output (e.g., beams of light) from the luminaire. Disposed proximate to the luminaire is the image capture device, such as a video camera. The image capture device is configured to capture an image of some or all of the illumination area. Thus, occupants as well as sources of glare in the area can be imaged. Operatively coupled to the luminaire and the image capture device is a computing system or image processing electronics. The computing system (e.g., one that is executable and controllable by a processor) is configured to reduce glare received by the occupant(s) by adjusting a light intensity of one or more of the individually operated light sources of the luminaire. These adjustments are based on, for example, a position of an occupant within the illumination area and a direction in which the occupant is gazing or otherwise facing relative to the luminaire as determined by analyzing the captured images. Sources of glare can also be identified in the images captured, and light from one or more of the individually operated light sources illuminating that glare source can be turned-off or dimmed as needed to reduce the observable glare to an acceptable level. So, lighting in the area can be controlled based on occupant gaze (to reduce direct glare), or observable glare sources (to reduce indirect glare), or a combination thereof.

General Overview

Lighting applications, such as those used in a home or in a retail space, often include luminaires that emit light. Light from these luminaires, however, can produce glare, causing discomfort to occupants or otherwise impair their ability to see. In general, there are two types of glare that a person can experience: (1) reflected glare and (2) direct glare. Reflected glare occurs when light falls on an object (e.g., a computer screen or mirror) and in turn is transmitted (or reflected) from the object to the eyes of an occupant. Direct glare, which shines directly into an occupant's eyes, can occur when there is a high contrast in light intensity between a bright light source (e.g., light bulb) and its surroundings. To avoid glare, occupants typically perform one of three actions: (1) move to face a different direction or move to another portion of an area, (2) block (e.g., create a barrier or shielding) or otherwise adjust (e.g., dim) the transmission of light causing the glare, or (3) move or change his/her task within the area (e.g., stop working at the computer screen that is reflecting the light). In addition, while physically adjusting a housing or a trim for a luminaire to reduce glare is an option, it is also time-consuming and not practical in most applications. Moreover, physical adjustments can also be inherently dangerous, especially, when the light fixture is located at a significant height within the area.

Thus, and in accordance with an embodiment of the present disclosure, techniques and architecture are disclosed for a system that automatically reduces glare directed at an occupant within an illuminated area. The system includes a luminaire that includes a plurality of light sources (e.g., light emitting diodes (LEDs)) with individually adjustable light intensities. The light sources collectively transmit light that defines an illumination area. Illumination from each light source is mapped to or otherwise associated with a particular portion of the illumination area using a position identifier. The position identifiers can be utilized for determining light source adjustments to achieve a desired change in illumination for a particular portion of the illumination area, as described herein.

Furthermore, an intensity of each light source is configured to be independently adjustable so that glare can be reduced in response to a position of the occupant and a direction in which the occupant is facing. By adjusting the intensity for individual light sources, the luminaire can transmit light that does not cause glare, either direct or reflected glare, and yet still sufficiently light the illuminate area. The luminaire, in some embodiments, includes a light engine such as a digital micromirror device (DMD) or a matrix type light engine, which can be configured to control the intensity of individual beams of light transmitted by the luminaire.

Disposed proximate to the luminaire, or otherwise within the given area being illuminated by the luminaire, is an image capture device, such as a video camera. The image capture device is configured to capture an image of the illumination area. The image capture device may be integrated, in part or in whole, with the luminaire or a separate device that is distinct from and remote to the luminaire. In some embodiments, the system can include multiple image capture devices that can be configured to operate independently or together. The image, in some embodiments, is a composite or combined image generated from multiple received images that collectively image the entire illumination area. A composite image is an image that is generated or otherwise created by combining visual elements from separate images into a single image. The images captured or otherwise acquired by the image capture device can be transmitted to a computing system operatively coupled to the luminaire and the image capture via wired or wireless network.

The computing system can be any suitable image processing electronics and is programmed or otherwise configured to process the received images from the image capture device. In particular, the computing system is configured to analyze the received images to identify instances where the occupant may experience direct or indirect glare (or both), and to then determine which of the individually adjustable light sources of the luminaire to adjust to reduce or eliminate that glare. The adjustments can be determined, for instance, based on a position of the occupant within the illumination area and a direction in which the occupant is facing relative to the luminaire as shown or otherwise inferred from the captured images. Using computer vision algorithms and techniques, the computing system can learn to recognize shapes in an image that correspond to an occupant (whether sitting, standing, walking, etc.). Thus, the luminaire can light up the illumination area without the occupant experiencing direct glare caused by the light transmitted therefrom. In addition, or alternatively, the adjustments can be determined, for instance, based on a location of an indirect glare source within the illumination area. So, for instance, if an image of the area indicates a glare source (e.g., light reflecting off of a metal object such as a vase or file cabinet), the individually adjustable light sources of the luminaire causing that glared can be adjusted. Numerous such use cases and scenarios will be appreciated in light of this disclosure.

Example Application

FIG. 1 is a plan view schematic of a pattern of light emitted by a luminaire into an illuminated area 110, in accordance with an embodiment of the present disclosure. As can be seen, the illumination area 110 includes a number of light beams 115A and 115B (collectively 115) generated by a luminaire, an occupant 120 having a visual field 125, and an object 130. The illumination area 110 is the portion of an area defined by the light beams 115 from the luminaire. In this case, the illumination area 110 is a circular area below the luminaire, although the illuminated area can have any number of shapes, as will be appreciated.

The light beams 115 in the illumination area 110 are produced by the light sources of the luminaire. As can be seen in FIG. 1, the illumination area 110 includes discrete light beams 115 because of the configuration of the luminaire. This is in contrast to other luminaires configured for more diffuse illumination, but the embodiments of this disclosure can be applied to both types. The light beams 115 form a pattern of light within the illumination area 110 based on an arrangement of individually controllable light sources (e.g., light emitting diodes (LEDs) or micromirrors or solid-state lasers) in the luminaire. This light beam pattern can be determined upon installation of the luminaire through a process called mapping. In more detail, each light beam 115 is mapped to a particular location within the illumination area 110. Mapping each light source not only ensures that luminaire transmits a sufficient amount of light to the illumination area 110, but also enables the light intensities of individual light sources within the luminaire to be adjusted, as described herein.

In an example case, the mapping process involves associating each light source with a position identifier corresponding to a particular location within the illumination area 110 in a grid or matrix fashion. The position identifier is a unique coordinate value that identifies a particular location within the area 110 (e.g., light source A is to transmit light to position (1,3)). This position identifier can be programmed into or otherwise accessible to the computing system or luminaire (or both), depending on a given application, to allow the computing system (or luminaire) to make individual light source adjustments relative the area 110. Once installed, the luminaire is configured to transmit light beams 115 to illuminate the area 110. The occupant 120 can then safely move about or perform tasks therein.

The area 110 also includes an occupant 120, in this example case. The occupant 120 has a visual field (VF) 125. The occupant 120 is a person within the illumination area 110 that, in this case is standing facing an object 130 that is within the visual field 125 of the occupant 120. The object 130 can be any device or surface (e.g., a mirror, toaster oven, vase, white board, computer screen, or television, to name a few examples of reflective objects/surfaces) capable of reflecting light from the luminaire towards the occupant 120. Light reflected from the object 130 within the visual field 125 of the occupant 120 re-directs incident light into the eyes of the occupant 120, thus causing the occupant 120 to experience indirect glare.

To prevent glare received by an occupant 120 within the illumination area 110, a system configured in accordance with an embodiment of the present disclosure is configured to adjust the light output of a luminaire within the illumination area 110 utilizing adaptive lighting techniques. Adaptive light techniques, such as individually controlling light sources of a luminaire, can be used to reduce glare experienced by an occupant 120, without diminishing the overall lighting effect for the illumination area 110. Both direct and reflected or so-called indirect glare can be reduced or eliminated by controlling the output of one or more light sources generating the light beams 115. As shown, light beams 115B are dimmed or turned off (as indicated by the dark shaded circles), thus reducing or eliminating direct and reflected glare experienced by the occupant 120. Light beams 115A, on the other hand, remain unchanged (as indicated by the unshaded circles), and thus continue to transmit light such that the occupant 120 can maneuver or perform tasks within the illumination area 110. The present disclosure, in more detail below, describes systems and techniques to reduce glare experienced by an occupant 120 using images of the illumination area 110 to adjust individual light sources for a given luminaire using adaptive lighting techniques.

Example Lighting Devices

Figure 2:
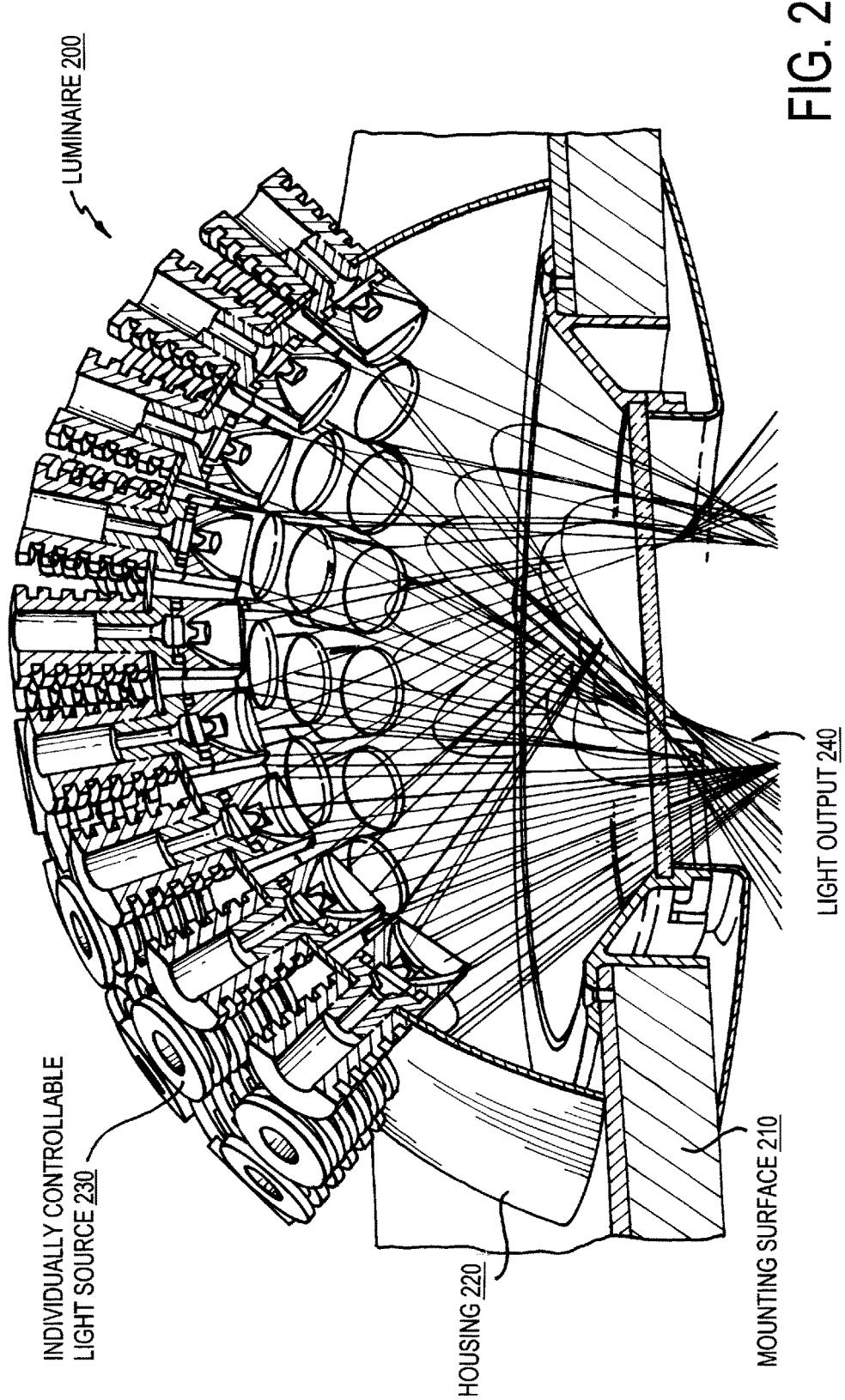
FIG. 2 is cross-sectional view of a luminaire configured in accordance with an embodiment of the present disclosure.

FIG. 2 is cross-sectional view of a luminaire in accordance with an embodiment of the present disclosure. In an example embodiment, luminaire 200 includes a housing 220 attached or otherwise fixed to a mounting surface 210. The shape of housing 220 can be customized, as desired for a given target application or end-use, and in some cases may be selected, in part or in whole, based on a given desired amount of overlap for the light beams of the emitted by luminaire 200. In some embodiments, such as that illustrated in FIG. 2, luminaire 200 may include a housing 220 of generally hemispherical shape (e.g., hemispherical, sub-hemispherical, hyper-hemispherical, or oblate hemispherical, among others). In some other embodiments luminaire 200 may include a can-style recessed lighting housing 220, such as, for instance, an insulation contact (IC) housing, a non-IC housing, or an airtight (AT) housing, among others. Housing 220 may be flat, concave, or convex in shape, in part or in whole, in accordance with some embodiments. Numerous suitable housing configurations will be apparent in light of this disclosure.

The luminaire 200 includes individually-controllable light sources 230 (hereinafter referred to as light sources 230) that generate a light output 240, as described further herein. The light sources 230 can be electronically controlled individually, in conjunction with one another, or both, providing luminaire 200 with an electronically adjustable light beam distribution capable of highly adjustable light emissions, as further described herein. Other control techniques for the light sources 230 will depend on a given application and will be apparent in light of this disclosure.

In accordance with some embodiments, a given light source 230 may include one or more solid-state emitters. A given solid-state emitter may be any semiconductor light source device, such as, for example, a light-emitting diode (LED), an organic light-emitting diode (OLED), a polymer light-emitting diode (PLED), or a combination thereof, among others. A given solid-state emitter may be configured to emit electromagnetic radiation (e.g., light), for example, from the visible spectral band, the infrared (IR) spectral band, the ultraviolet (UV) spectral band, or a combination thereof, among others. In some embodiments, a given solid-state emitter may be configured for emissions of a single correlated color temperature (CCT) (e.g., a white light-emitting semiconductor light source). In some other embodiments, a given solid-state emitter may be configured for color-tunable emissions; for instance, a given solid-state emitter may be a multi-color (e.g., bi-color, tri-color, etc.) semiconductor light source configured for a combination of emissions, such as red-green-blue (RGB), red-green-blue-yellow (RGBY), red-green-blue-white (RGBW), dual-white, or a combination thereof, among others. In some cases, a given solid-state emitter may be configured, for example, as a high-brightness semiconductor light source. In some embodiments, a given solid-state emitter of luminaire 200 may be provided with a combination of any one or more of the aforementioned example emissions capabilities.

In accordance with some embodiments, a given light source 230 of luminaire 200 may include a laser diode solid-state emitter and may be configured to utilize a laser-activated remote phosphor (LARP). As will be appreciated in light of this disclosure, laser diodes typically have a small source size and a small angular deviation. As will be further appreciated, however, it may be desirable, in some instances, to provide light sources 230 having narrow focus, high radiance, or both, for efficient optical coupling. Thus, and in accordance with some embodiments, a given light source 230 employing LARP may utilize one or more short-wavelength laser diode solid-state emitters to excite a remote phosphor, for instance, that down-converts the incident light to longer wavelength(s). In some cases, this may help to provide high radiance for light over a broader target spectral range than may be provided solely by a laser diode solid-state emitter having emissions within a generally narrow spectral region. In some instances, a small beam spot size may be provided, for example, by focusing, concentrating, or both, the laser light emitted by the laser diode solid-state emitter onto the remote phosphor. In an example embodiment, the phosphor may be embedded in a reflective surface such that backward-directed luminescent light is returned back in the direction of the laser diode solid-state emitter by traversing back through the phosphor.

Figures 3A, 3B:
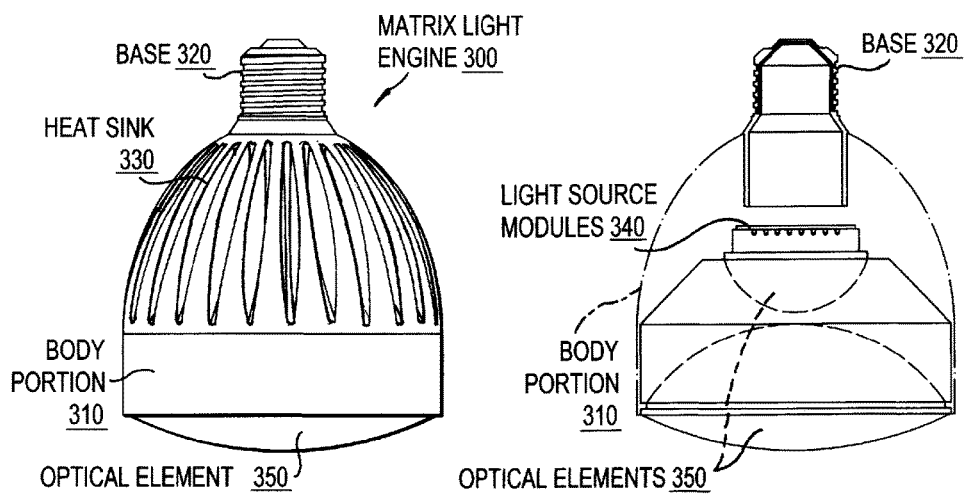
FIGS. 3A-3B are side and cross-sectional views, respectively, of a matrix light engine configured in accordance with an embodiment of the present disclosure.

FIGS. 3A-3B are side and cross-sectional views, respectively, of a matrix light engine configured in accordance with an embodiment of the present disclosure. As will be appreciated in light of this disclosure, a matrix light engine 300 configured as described herein may be compatible with power sockets/enclosures typically used in existing luminaire structures, such as, for example: MR16 or other multi-faceted reflector (MR) configuration; PAR16, PAR20, PAR30, PAR38, or other parabolic aluminized reflector (PAR) configuration; BR30, BR40, or other bulged reflector (BR) configuration; and 4"-6" recessed kits, to name a few examples. In some cases, the matrix light engine 300 configured as described herein may be considered, in a general sense, a retrofit or other drop-in replacement lighting component, in accordance with some embodiments. As will be appreciated in light of this disclosure, the particular configuration of the matrix light engine 300 may be customized, for instance, to provide a given amount of luminous flux desired for a given target application or end-use.

As can be seen, matrix light engine 300 may include a body portion 310, the material, geometry, and dimensions of which may be customized, as desired for a given target application or end-use. Matrix light engine 300 also may include a base portion 320 configured to be coupled with a given power socket so that power may be delivered to matrix light engine 300 for operation thereof. To that end, base portion 320 may be of any standard, custom, or proprietary contact type and fitting size, as desired for a given target application or end-use. In some cases, base portion 320 may be configured as a threaded lamp base including an electrical foot contact (e.g., such as in FIGS. 3A-3B). In some other cases, base portion 320 may be configured as a bi-pin, tri-pin, or other multi-pin lamp base. The matrix light engine 300, in other cases, may not include a base or a socket, but rather one or more electrical connections that operatively connect it to a light source driver of an existing luminaire. Other suitable configurations for body portion 310 and base portion 320 will depend on a given application and will be apparent in light of this disclosure.

In some embodiments, matrix light engine 300 optionally may include a heatsink portion 330 configured to facilitate heat dissipation for engine 300. To that end, optional heatsink portion 330 may be formed, in part or in whole, from any suitable thermally conductive material. For instance, optional heatsink 330 may be formed from any one, or combination, of aluminum (Al), copper (Cu), gold (Au), brass, steel, or a composite or polymer (e.g., ceramics, plastics, etc.) doped with thermally conductive material(s). The particular configuration, as well as geometry and dimensions, of optional heatsink 330 may be customized, as desired for a given target application or end-use. In some embodiments, optional heatsink 330 may include a plurality of fins, foils, or other features typically utilized in heat management for electronic components. In some cases, optional heatsink 330 may be formed as a single unitary (e.g., monolithic) component, whereas in other cases, it may be formed as an assembly of separate components. Other suitable configurations for optional heatsink 330 will depend on a given application and will be apparent in light of this disclosure.

In accordance with some embodiments, matrix light engine 300 may include one or more light source modules 340. A given light source module 340 provided as described herein may be disposed in any desired orientation with respect to host matrix light engine 300. In some cases, matrix light engine 300 may include multiple light source modules 340, at least one of which may be disposed in a first orientation and at least one of which may be disposed in a second, different orientation. In some instances, matrix light engine 300 may include one or more light source modules 340 oriented to provide adjustable direct and/or indirect lighting from a host luminaire. In some embodiments, matrix light engine 300 may be configured to be operatively coupled with a luminaire to provide either or both upward and downward lighting (e.g., either or both direct and indirect lighting).

As can be seen matrix light engine 300 can also include one or more optical elements 350, which may have any of a wide range of configurations. An optical element 350 is a structure which performs an optical function, such as refraction, diffraction, attenuation, or blocking of the light or a modification in the character or properties of the light. A given optical element 350 may be configured to transmit, in part or in whole, emissions received from a given light source module 340 optically coupled therewith, in accordance with some embodiments. A given optical element 350 may be configured, in accordance with some embodiments, for focusing or collimating emissions (or both). A given optical element 350 may be formed from any one, or combination, of suitable optical materials. For instance, in some embodiments, a given optical element 350 may be formed from a polymer, such as poly(methyl methacrylate) (PMMA) or polycarbonate, among others. In some embodiments, a given optical element 350 may be formed from a ceramic, such as sapphire ($Al_2O_3$) or yttrium aluminum garnet (YAG), among others. In some embodiments, a given optical element 350 may be formed from a glass. In some embodiments, a given optical element 350 may be formed from a combination of any of the aforementioned materials. Furthermore, the dimensions and geometry of a given optical element 350 may be customized, as desired for a given target application or end-use.

Figure 4:
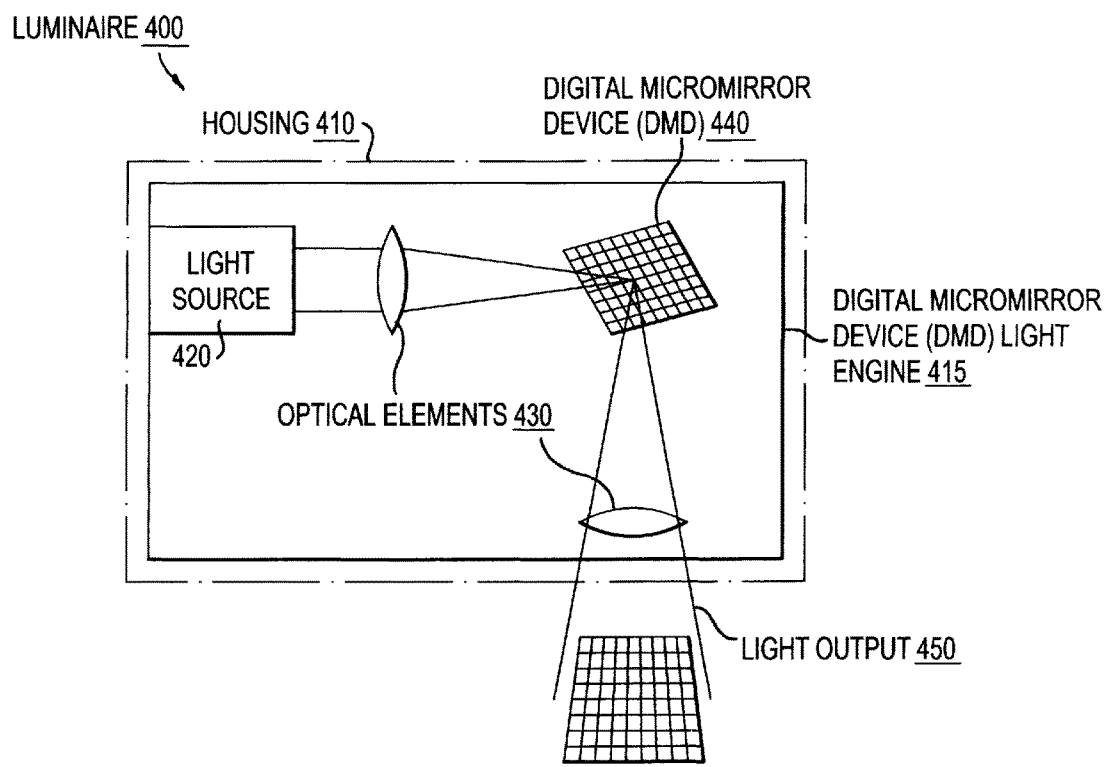
FIG. 4 is a block diagram of a luminaire including a digital micromirror device light engine, in accordance with another embodiment of the present disclosure.

FIG. 4 is a block diagram of a luminaire 400 including a digital micromirror device light engine in accordance with another embodiment of the present disclosure. In an example embodiment, the luminaire 400 includes a housing 410 in which a digital micromirror device (DMD) light engine 415 is disposed therein. The DMD light engine 415 includes a light source 420, optical elements 430, and a DMD 440. Numerous other luminaire configurations will be apparent light of the present disclosure. As will be appreciated in light of this disclosure, a DMD light engine configured as described herein may be compatible with enclosures typically used in existing luminaire structures. In a general sense, a DMD light engine replaces traditional light sources (e.g., a light bulb or lamp). The DMD light engine generates and transmits light using a combination of a light source and optical elements. Once generated, the light is then subsequently reflected using one or more individually adjustable micromirrors through an aperture within a housing to illuminate the area about the luminaire. Note that each mirror of the DMD device can be individually adjusted so as to transmit the reflected light in numerous patterns to provide varying amounts of illumination within the area.

In accordance with some embodiments, a given light source 420 may include one or more solid-state emitters. A given solid-state emitter may be any semiconductor light source device, such as, for example, a light-emitting diode (LED), an organic light-emitting diode (OLED), a polymer light-emitting diode (PLED), or a combination thereof, among others. In one specific example embodiment, light source 420 is a laser diode solid-state emitter and may be configured to utilize a laser-activated remote phosphor (LARP), as previously described in relation to FIG. 2 herein. Numerous other light source configurations will be apparent in light of the present disclosure.

The light generated by light source 420 is transmitted through one or more optical elements 430. An optical element 430 is a structure which performs an optical function, such as refraction, diffraction, attenuation, or blocking of the light or a modification in the character or properties of the light. A given optical element 430, for example an optical lens, may be configured, in accordance with some embodiments, for focusing or collimating emissions (or both). A given optical element 430 may be formed from any one, or combination, of suitable optical materials, such as those previously describe in relation to FIGS. 3A-3B. Furthermore, the dimensions and geometry of a given optical element 430 may be customized, as desired for a given target application or end-use.

The DMD light engine 415 further includes a DMD 440 configured to reflect light from the light source 420 to illuminate the illumination area 110. In an example embodiment, DMD 440 is a set of rotatable mirrors that can control the intensity and direction of incident light (e.g., light transmitted from the light source 420). The individual mirrors, in some embodiments, can be arranged in a matrix fashion, such that the intensity and direction of incident light is determined based on position of the mirrors. Mirror position can be controlled electrostatically to achieve a desired light output, in some embodiments. Other DMD configurations will be apparent in light of the present disclosure.

System Architecture and Operation

Figure 5:
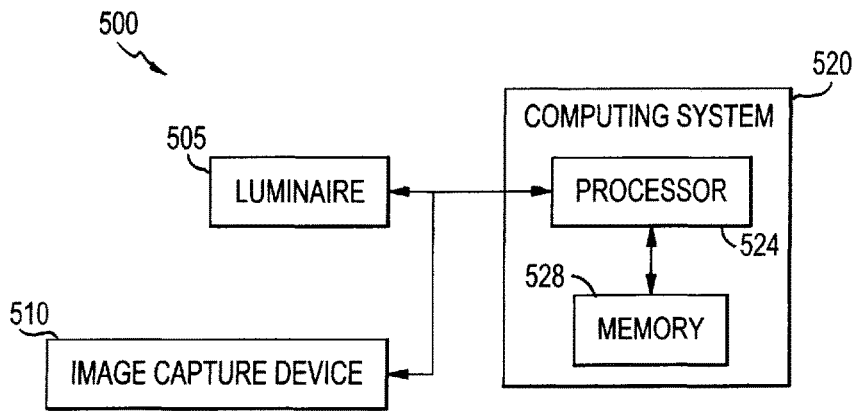
FIG. 5 is a block diagram of lighting system for operating a luminaire to reduce glare, in accordance with an embodiment of the present disclosure.

FIG. 5 is a block diagram of a lighting system 500 for reducing glare experienced by an occupant using adaptive light techniques according to an embodiment. That is, the system 500 utilizes images of an illumination area to determine a position and a direction in which an occupant is facing relative to the luminaire, as well as to determine sources or indirect glare. This information can be used to determine which light sources of the luminaire to adjust (e.g., dim or turn off) to reduce or eliminate glare directed at the occupant, whether it be direct glare from the luminaire itself or indirect glare reflected from some object in the illumination area. The lighting system 500 includes a luminaire 505, an image capture device 510, and a computing system 520.

Examples of the luminaire 505 include any lighting device that includes adjustable light sources, such as the luminaire as illustrated in FIG. 2, a matrix light emitting diode (LED) as illustrated in FIGS. 3A-3B, or a digital micromirror device as illustrated in FIG. 4. In an example embodiment, the luminaire 505 includes individually controllable light sources (e.g., LEDs) configured to transmit light (e.g., light beams) to create the illumination area 110. The luminaire 505 further includes electronics, such as a processor and a driver, for operating the light sources. A control interface within the luminaire 505 receives information, such as instructions/commands from a computing system or controller 520, and is communicatively coupled to the processor or driver (or both). Numerous other luminaire configurations will be apparent in light of the present disclosure.

The image capture device 510 of the system 500 is programmed or otherwise configured to capture or acquire images of the area (e.g., the illumination area) illuminated by the luminaire 505. In a general sense, the image capture device 510 can be any device configured to capture digital images, such as a still camera (e.g., a camera configured to capture still photographs) or a video camera (e.g., a camera configured to capture moving images including a plurality of frames), and may be integrated, in part or in whole, with luminaire 505 or a separate device that is distinct from luminaire 505. The images can be permanently (e.g., using non-volatile memory) or temporarily stored (e.g., using volatile memory), depending on a given application, so that they can be analyzed by the computing system 520, as further described herein. In an example embodiment, the image capture device 510 is a single or high resolution (megapixel) camera that captures and processes real-time video images of the illumination area. Furthermore, the image capture device 510 may be configured, for example, to acquire image data in a periodic, continuous, or on-demand manner, or a combination thereof, depending on a given application. In accordance with some embodiments, image capture device 510 can be configured to operate using light, for example, in the visible spectrum, the infrared (IR) spectrum, or the ultraviolet (UV) spectrum, among others. Componentry of image capture device 510 (e.g., optics assembly, image sensor, image/video encoder) may be implemented in hardware, software, firmware, or a combination thereof. In some embodiments, the field of view (FOV) of the image capture device 510 can be larger than the illumination area, so that the captured image has sufficient size to fully include the area of interest.

The system 500 may include one or more image capture devices 510. In an example embodiment, the image capture device 510 is located proximate to the luminaire. Such an arrangement avoids distortion or errors caused by a parallax effect. A parallax effect occurs when the position or direction of an object (e.g., an occupant) appears to differ when viewed from different positions (e.g., the position of the luminaire versus position of the image capture device). Thus, an image capture device located a distance from the luminaire can cause the system 500 to determine an incorrect location for the occupant within the illumination area. In this instance, however, errors caused by this parallax effect are negligible or otherwise eliminated because the image capture device 510 and the luminaire are at approximately the same position. In other instances in which the image capture device 510 is not proximate to the luminaire, the system 500 is configured to correct or ignore errors caused by the parallax effect, as described further herein. In some other embodiments, the image capture device 510 is configured to capture images that include illumination areas for multiple luminaires 505. The system 500, in other embodiments, includes multiple image capture devices 510 (e.g., one for each luminaire 505) that can operate independently or together. When operating together, the system 500 can be configured to generate a composite or combined image that can be used to determine a position and direction of an occupant. A composite image is an image that is generated or otherwise created by combining visual elements from separate images into a single image. The multiple image capture devices 510, in some embodiments, can be located at different locations to capture different views of one or more illumination areas. In such instances, the system 500 is configured to analyze these different views separately or together (e.g., as a composite image) to determine a position and direction for the occupant. Other suitable image capture device configurations will depend on a given application and will be apparent in light of this disclosure.

The computing system 520 may be any suitable computing system capable of being operatively coupled to a luminaire 505 and image capture device 510. In some instances, the computing system 520 is disposed within the luminaire 505. While in other instances, the computing system 520 is positioned at a different location than the luminaire 505 (e.g., in another room or building). In such instances, the computing system 520 can communicate with the luminaire 505 over a wired or wireless network, such as a cloud-based or local server computer, and may be programmed or otherwise configured to provide lighting commands/instructions for adjusting the output (e.g., light intensity of individual light sources) of the luminaire 505, according to some embodiments. For example, a lighting command/instruction, might be to dim one or more light sources of the luminaire 505 to reduce observable glare, based on an analysis of an image of the illumination area. Numerous other such configurations will be apparent in light of this disclosure.

The computing system 520 includes a processor 524, which in turn is programmed or otherwise configured to, among other things, control the lighting system to reduce glare based on received imagery of the illuminated area. For example, in some embodiments, the processor 524 is configured to analyze images from the image capture device 510 and determine the position and gaze of occupants within the illumination area, and/or the position of indirect glare sources within the illumination area. The image processing may include, for example, segmentation and computer vision to identify face and gaze direction, and intensity maps to identify glare sources. In a more general sense, standard image processing techniques can be applied to the contexts given in this disclosure, to identify gaze direction and glare sources. The processors 524 are further configured to adjust the light output of the luminaire 505 so as to prevent glare caused by light from the luminaire 505. The lighting control instructions generated by the processor 524, in some embodiments, can be transmitted to the luminaire 505 via a wired or wireless network, as previously described above.

As can be seen, the computing system 520 further includes a memory 528 accessible by the processor 524. The data created and/or managed by the processor 524 may be stored within a memory 528 to support operations of the computing system 520. Memory 528 can be of any suitable type (e.g., RAM and/or ROM, or other suitable memory) and size, and in some cases may be implemented with volatile memory, non-volatile memory, or a combination thereof. Memory 528 may also be any physical device capable of non-transitory data storage, such as a computer program product that includes one or more non-transitory machine readable mediums encoding a plurality of instructions that when executed by one or more processors cause a process or methodology for operating a luminaire to be carried out.

Methodology

Figure 6:
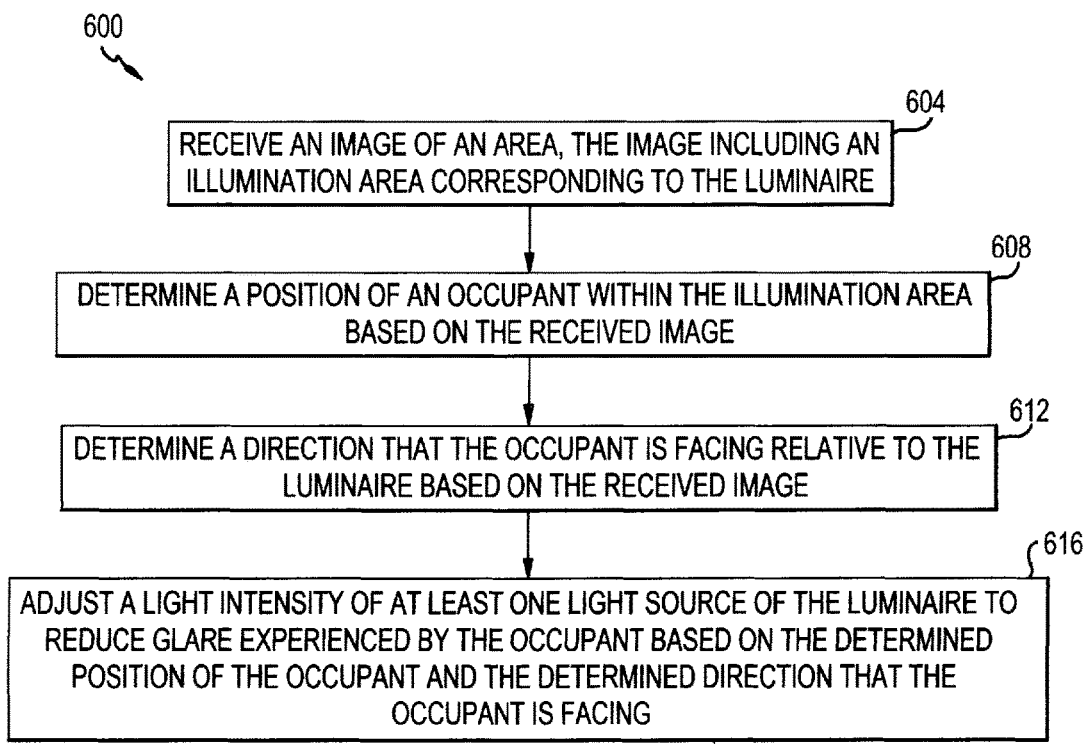
FIG. 6 is a flow chart for a method of operating a luminaire, in accordance with an embodiment of the present disclosure.

FIG. 6 is a flow chart illustrating a method 600 of operating a luminaire in accordance with an embodiment of the present disclosure. The method 600 may be performed by a processor of a computing system (e.g., computing system 520) that is communicatively coupled to a luminaire (e.g., luminaire 505) and an image capture device (e.g., image capture device 510). The method 600 includes receiving an image of an area illuminated by the luminaire in block 604. The received image is captured using the image capture device, as described above. In an example embodiment, an image capture device (e.g., a camera) is disposed adjacent to the luminaire (e.g., close to the aperture of the luminaire) and directed towards the area below the luminaire (e.g., looking down on the area from a view point of the luminaire). Thus, the image capture device acquires images of the illumination area defined by the light transmitted from the luminaire. In examples in which the system includes multiple image capture devices, the multiple image capture devices may operate together to provide unified solution, such as a composite image.

With the image capture device positioned adjacent to the luminaire, the system can process the acquired image to determine a position of the occupant within the area and a direction in which the occupant is facing, as will be described further herein. In other embodiments, the image capture device is located at a distance from the luminaire, which in turn can cause a parallax effect as previously described herein. To address this parallax effect, the angular coordinates for each light source are corrected, using the following equations. Note that the distance from the luminaire to a surface below the luminaire (e.g., the floor) can vary from one area to another, and thus each luminaire (or computing system) is programmed with the specific dimensions for a given area.

$$\tan\emptyset = \frac{x}{h} \quad \text{Equation (1)}$$

The parameter "Ø" in equation (1) above represents the angle from center of the luminaire to a line of sight from the luminaire to a location of the occupant within the area. Variable "x" represents the horizontal distance along the surface below the luminaire (e.g., the floor) from the center of the luminaire to the location of the occupant. Similarly, variable "h" represents a vertical distance from the surface below the luminaire to the luminaire (e.g., the height at which the luminaire is positioned above the floor).

$$\tan\emptyset' = \frac{(D+x)}{h} \quad \text{Equation (2)}$$

The parameter "Ø'" is the angle from center of the image capture device to a line of sight from the device to the location of the occupant. Variable "D" is the horizontal distance or displacement from the image capture device to the luminaire. Since both equations (1) and (2) include the same variable "x", equation (1) can be solved for "x" and then substituted into equation (2) to derive equation (3), which in turn can be solved for the angle Ø' to derive equation (4). With the angles determined, the computing system may be able to compensate for the parallax effect in the captured image of the illumination area.

$$\tan\emptyset' = \left(\frac{D}{h}\right) + \tan\emptyset \quad \text{Equation (3)}$$

$$\emptyset' = \arctan\left(\frac{D}{h} + \tan\emptyset\right) \quad \text{Equation (4)}$$

The method 600 further includes determining a position of the occupant within the illumination area based on the received image in block 608. In an example embodiment, the computing system receives images of the illumination area from the image capture device. Once received, the images are processed to detect or otherwise determine whether an occupant has entered the illumination area. For instance, computer vision algorithms and techniques can be utilized to determine that an occupant is shown in the received image. These software algorithms utilize a large training set of images to learn various typical shapes of an occupant within an image. The set of images, in some embodiments, includes previous images of occupants in various positions and facing various directions relative to the luminaire. In addition, the set of images can also include images of different occupant tasks, such as walking, sitting or gazing. The set of images is created from the perspective of the image capture device (e.g., looking down onto the floor). In essence, the system learns various shapes of pixels that correspond to an occupant from the set of images, and then analyzes the received images to determine if any group of pixels corresponds to a known shape for an occupant (e.g., object classification using segmentation and machine learning). Once an occupant is detected, the computing system is configured to determine a position of the occupant in block 608. In more detail, as previously described, position identifiers are assigned to one or more locations of the area so as to uniquely identify the different portions of the area. The computing system is programmed to assign these unique coordinate values to one or more pixels of the received image. The received image is analyzed to determine which pixels (if any) form a shape that is known to be an occupant, as described above. Using those pixels, the position of the occupant within the area can be determined based on the position identifier associated with those pixels that indicate an occupant is present.

The method 600 further includes determining a direction that the occupant is gazing or otherwise facing relative to the luminaire in the received image in block 612. As previously described, the computing system is configured to learn the position of an occupant based on a training set of images. This training set of images can also be utilized by the computing system to determine a direction in which the occupant is facing relative to the luminaire. In an example embodiment, the computing system executes software algorithms, such as computer vision algorithms, to learn facial features, such as a pair of eyes, a mouth or a nose, which can be used to determine an occupant's direction. In addition, activities of an occupant can also indicate a direction in which the occupant is gazing or facing. Activities, such as walking, sitting or gazing, can be used to infer a direction of the occupant when the occupant's facial features cannot be seen or are otherwise not recognizable in the received image (e.g., the occupant's head is directed towards the floor while walking). Such activities can be used to infer a direction in which the occupant is gazing/facing, because these activities inherently involve the occupant looking or facing a particular direction during such activities (e.g., occupants walk in the direction that they are facing). In addition, occupant features, such as a top of a head, feet or arms, either alone or in combination can be used to infer a direction in which the occupant is facing when the occupant's facial features are not visible. In some instances, the computing system can determine a direction in which the occupant is facing relative to the luminaire based on an identified occupant activity (e.g., walking) and one or more non-facial features (e.g. feet or arms). Numerous other combinations of features for determining a direction of an occupant will be apparent in light of the present disclosure.

The method may further include identifying reflected light or indirect glare that may be observable by the occupant, by identifying high intensity or so-called wash-out (white spot or other heavy luminance-based evidence of glare) locations in the image. For instance, the system can be configured to analyze the received image to identify an indirect glare source within the area based on a group of pixels that have high light intensity values as compared to nearby or surrounding pixels. In response, the system can be configured to determine a location of the indirect light source within the area based on a position identifier for that group of pixels. With the location of the indirect glare source determined, the system can adjust the light output for at least one light source of the luminaire that is mapped to or otherwise associated with that location, as described herein.

The method also includes adjusting a light intensity of at least one light source of the luminaire to reduce glare experienced by the occupant based on the determined position of the occupant and the determined direction that the occupant is facing in block 616. With a position and a direction for the occupant determined, the computing system can transmit instructions and/or commands to the luminaire to adjust the light intensity of one or more light sources directed towards the occupant. In an example embodiment, the luminaire is configured to automatically adjust its output so as to deliver light to the area without the portion of the light output causing the glare experienced by the occupant. In more detail, the computing system determines those light sources of the luminaire that are transmitting light to the occupant's position and/or in a direction in which the occupant is facing based on the position identifiers associated with each light source. Using the position identifier associated with the pixels of the captured image corresponding to the occupant, the computing system can identify at least one light source of the luminaire that is mapped to or otherwise associated with the same position identifier. The computing system transmits a signal to the luminaire, which in turn is received by a processor of the luminaire. The processor, in response, transmits the signal information driving electronics (e.g., a driver) to adjust the light intensity of one or more light sources of the luminaire. The processor is communicatively coupled to at least one driver using a bus, such as a universal asynchronous receiver/transmitter (UART) or an inter-integrated circuit (I2C). The driver is configured to adjust the light intensity for one or more light sources by turning off or dimming the light sources. The light sources can be dimmed utilizing pulse-width modulation or current techniques. In some embodiments, the light intensity values within the received image corresponding to the light sources can be used to determine how to adjust the light sources.

The light sources of the luminaire can be adjusted in variety of ways depending on a given application. For instance, the luminaire, in some cases, may select a light intensity at which to operate the identified light source based on the direction that the occupant is facing relative to the luminaire. In more detail, when the occupant is in a direction facing the luminaire, then the computing system can select a light intensity value (e.g., 25%, 50%, or 75%) that is significantly less than a full intensity value because the occupant is experiencing direct glare (light shining directly his/her eyes). On the other hand, when the occupant is facing away from the luminaire, the computing system can select a light intensity value (e.g., 80%, 90% or (95%) that is slightly less than the full intensity value because the occupant is experiencing reflected glare. Small changes in light intensity can cause the occupant to experience significantly less reflected glare because the nature in which light behaves when reflected off of a given surface. No matter their degree, adjustments in light intensity can be accomplished in a continuous fashion based on input from the computing system. The luminaire, in other cases, is configured to adjust one or more light sources in an incremental fashion and over a period of time (e.g., 10 seconds), so as to not diminish the overall lighting experience. In some cases, in which the system detects multiple occupants the computing system can adjust a light intensity value for all the light sources of the luminaire (e.g., 50% of full light intensity values). In other instances, the system is configured to adjust light sources not only transmitting light directly to the occupant, but also to locations adjacent to the occupant. In such instances, the light sources transmitting light adjacent to the occupant can be adjusted less than the light source directly transmitting light to the occupant because they contribute to but are not directly causing the glare. The luminaire, in some other cases, may adjust the light source that is transmitting light nearest to the occupant's position rather than adjusting multiple light sources that collectively are responsible for the occupant experiencing glare.

Further Considerations

Numerous other configurations will be apparent in light of this disclosure. For example, in some embodiments of the present disclosure, the system is configured to reduce reflected glare (e.g., light hitting shiny objects in the room) from other sources (e.g., a window or another light fixture). In an example embodiment, reflected glare can be reduced by manipulating light polarization. In more detail, the luminaire may be configured to emit polarized light (either using polarized sources like lasers or with polarized filters) towards the reflected glare, and thereby reducing the intensity of the reflected glare. The luminaire can detect reflective objects that cause reflected glare by identifying retro-reflections in the received image taken. These retro-reflections can be identified based on a light intensity value associated with each pixel of the received image. For instance, the system can be configured to determine that a group of pixels having high light intensity values as compared to nearby or surrounding pixels, indicates the presence of retro-reflections. In response, the system is configured to determine a location in which receives the reflected light based on light intensity values for pixels of the image using techniques and methods previously described herein. With the location determined, the system can be configured to cause the luminaire to transmit polarized light to that location to reduce glare caused by the reflected light.

In other embodiments, the adaptive lighting techniques of the present disclosure can be combined with other sensors within the area to monitor various area conditions, such as environmental conditions or security postures. The system may include sensors, such as temperature, light, water or pressure sensors, which provide information about the area. This information can be combined with the received images to adjust an environmental condition (e.g., heating, cooling or lighting). In other instances, information from additional sensors, such as occupancy, motion or vibration sensors, can be combined with the received images to adjust security settings. Numerous other sensor combinations will be apparent in light of the present disclosure.

In some other embodiments, the system is configured to react to or otherwise predict the occupant behavior to prevent or reduce glare. The system can be configured to learn occupant behavior over time to identify occupant behavioral patterns. Using these patterns, the system can infer an occupant's next move to make additional adjustments to prevent glare. The system, for example, can react to an occupant sitting within the illumination area by increasing the light output of the luminaire to enable the occupant to perform a task (e.g., reading a book or working on a laptop computer). The system can be further configured, in some embodiments, to predict a next action for the occupant (e.g., an intended path of travel) based on its learned knowledge of occupant behavior within the area (e.g., occupants typically leave through a particular doorway). Thus, the system is configured to proactively adjust the light output of the luminaire in anticipation of occupant behavior that would likely cause them to experience glare.

In some embodiments, the system is configured to adjust the light output of the luminaire to achieve an optimized or otherwise desired lighting condition. For instance, the system can be configured to detect light trespass. Light trespass occurs when light from another source (e.g., a street light transmitting light through a window) affects the lighting condition within the illumination area. The system is configured to analyze the pixels of the received image to determine light intensity values (e.g., high light intensity values) associated with external sources of light. In response, the system is configured to adjust a light intensity for one or more of light sources of the luminaire to reduce or otherwise eliminate the adverse effects caused by the light transmitted from another source. The system can also be configured to optimize an overall light condition to reduce glare based on a contrast between foreground and background luminance. In such instances, the system is configured to analyze the received image by comparing light intensity values for individual (or groups of) pixels to one another. Based on this comparison, the system can identify deviations or gradients in light intensity values among pixels of the image that are likely to indicate glare. In turn, the system is configured to adjust the light intensities (e.g., higher or lower) for light sources associated with those pixels to reduce the contrast between foreground and background luminance.

In some other embodiments, the system can be configured to operate as an autonomous or self-directed system or in response occupant requests or feedback. For autonomous applications, the system is configured to automatically capture images of the area and make adjustments based on analysis of those images, as previously described herein. Thus, changes in system operation occur based on the changes observed and communicated via the received images. In some instances, however, the system can be configured to perform adjustments based on a request or feedback from an occupant. In such instances, the occupant can use a computing device, such as a smart phone or tablet, to transmit a request for changes in the lighting output of a luminaire (e.g., increase light intensity where I am sitting) to the computing system via a network (e.g., a wireless or cellular network). In other instances, the computing system can initiate contact with the occupant to gather additional information (e.g., survey information) regarding the performance of the lighting system.

In some embodiments, the system is configured to identify and resolve conflicts between multiple adjustments for different occupants by operating in an override mode. The system can be configure to operate in one of two modes: (1) normal mode or (2) override mode. When operating in normal mode, the system performs lighting adjustments based on received images of the area, previously described herein. For situations, in which there are two or more occupants within the illumination area, the computing system may identify a conflict between a first adjustment for one occupant and a second adjustment for another occupant. A conflict occurs when the computing system determines that one adjustment for an occupant may adversely affect another occupant (e.g., causing the other occupant to experience glare). In such instances, the system can be configured to eliminate this conflict by dimming all the light sources to a minimum light level. A minimum light level is the least amount of light to allow occupants to safely navigate or use the illumination area. Once one (or both) occupants change position or leave the area, then computing system can determine that conflict has been resolved and can return to operating in normal mode. In some other embodiments, the system can maintain a current lighting level or configuration if a conflict is detected. In such an instance, the light intensity of the light sources of the luminaire can remain constant regardless of the activity within the area until the conflict is resolved. Numerous other ways of operating the luminaire will be apparent in light of the present disclosure.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A system comprising:
a luminaire including a plurality of individually controllable light sources located within an area to illuminate the area;
one or more image capture devices configured to capture an image of the area; and
a computing system configured to:
determine a position of an occupant within the area;
determine a direction in which the occupant is facing relative to the luminaire;
determine a position of one or more indirect glare sources within the area; and
adjust a light intensity of the plurality of individually controllable light sources of the luminaire to reduce glare experienced by the occupant from one or more glare sources based on the determined position of the occupant and the determined direction that the occupant is facing, wherein:
when the one or more glare sources includes direct glare from the luminaire, the light intensity of a first set of the plurality of individually controllable light sources is adjusted to a first light intensity in order to reduce direct glare experienced by the occupant from the luminaire; and
when the one or more glare sources includes at least one of the one or more indirect glare sources, for each indirect glare source the occupant is facing the light intensity of a subset of the plurality of individually controllable light sources is adjusted to a second light intensity in order to reduce indirect glare experienced by the occupant from that indirect glare source.

2. The system of claim 1, wherein the system includes a plurality of luminaires and at least some of the luminaires includes the one or more image capture devices, and the plurality of luminaires are communicatively coupled to the computing system.

3. The system of claim 1, wherein the luminaire includes a matrix light engine configured to be received within a socket of the luminaire, the matrix light engine comprising:
 a base;
 a body portion attached to the base; and
 a light source module disposed within the base and configured to transmit light to the area using at least one optical element, the light source module including the plurality of individually controllable light sources.

4. The system of claim 1, wherein the luminaire includes at least one optical element and a digital micromirror device that transmit light from at least one of the individually controllable light sources to the area.

5. The system of claim 1, wherein the computing system is further configured to adjust the light intensity of at least one of the individually controllable light sources of the luminaire based on a light intensity from a source other than the luminaire to reduce glare experienced by the occupant.

6. A method for operating a luminaire, comprising:
 receiving an image of an area illuminated by the luminaire, the luminaire located within the area and comprising a plurality of light sources;
 determining a position of an occupant within the area based on the received image;
 determining a direction that the occupant is facing relative to the luminaire based on the received image;
 determining a position of one or more indirect glare sources within the area; and
 adjusting a light intensity of the plurality of light sources of the luminaire to reduce glare experienced by the occupant from one or more glare sources based on the determined position of the occupant and the determined direction that the occupant is facing, wherein:
  when the one or more glare sources includes direct glare from the luminaire, the light intensity of a first set of the plurality of light sources is adjusted to a first light intensity in order to reduce direct glare experienced by the occupant from the luminaire; and
  when the one or more glare sources includes at least one of the one or more indirect glare sources, for each indirect glare source the occupant is facing the light intensity of a subset of the plurality of light sources is adjusted to a second light intensity in order to reduce indirect glare experienced by the occupant from that indirect glare source.

7. The method of claim 6, wherein determining the position of the occupant within the area comprises analyzing the image to identify at least one shape within the image that corresponds to an occupant within a previous set of images.

8. The method of claim 6, wherein determining the position of the occupant within the area comprises:
 associating a position identifier with each location in the area that receives a light output from a light source of the luminaire;
 associating each position identifier with at least one pixel of the image;
 determining a plurality of pixels of the image that corresponds to the occupant; and
 associating the position of the occupant within the area with the at least one light source of the luminaire based on the position identifiers of the plurality of pixels and position identifiers of each of the light sources of the luminaire.

9. The method of claim 6, wherein determining the direction that the occupant is facing relative to the luminaire comprises analyzing the image to identify a plurality of pixels that indicates a direction that the occupant is facing based on a set of previous images.

10. The method of claim 9, wherein determining the direction that the occupant is facing relative to the luminaire comprises identifying at least one of a feature and an activity for the occupant based on the set of previous images.

11. The method of claim 6, wherein adjusting the light intensity of at least one light source of the luminaire further comprises:
 identifying a light source of the luminaire to be adjusted based on the determined position of the occupant within the area and a position identifier associated with that position; and
 selecting a light intensity at which to operate the identified light source based on the direction that the occupant is facing relative to the luminaire.

12. The method of claim 6, further comprising correcting at least one angular coordinate for a light source of the luminaire based on a position of an image capture device relative to the luminaire, wherein the image capture device captures the image of the area.

13. A computer program product including one or more non-transitory machine readable mediums having a plurality of instructions encoded thereon that when executed by one or more processors cause a process to be carried out, the process comprising:
 determining a position of an occupant within an area illuminated by a luminaire, the luminaire located within the area and including a plurality of light sources;
 determining a direction in which an occupant is facing relative to the luminaire;
 determining a position of one or more indirect glare sources within the area; and
 adjusting a light intensity of the plurality of light sources of the luminaire to reduce glare experienced by the occupant from one or more glare sources based on the determined position of the occupant and the determined direction that the occupant is facing, wherein:
  when the one or more glare sources includes direct glare from the luminaire, the light intensity of a first set of the plurality of light sources is adjusted to a first light intensity in order to reduce direct glare experienced by the occupant from the luminaire; and
  when the one or more glare sources includes at least one of the one or more indirect glare sources, for each indirect glare source the occupant is facing the light intensity of a subset of the plurality of light sources is adjusted to a second light intensity in order to reduce indirect glare experienced by the occupant from that indirect glare source.

14. The computer program product of claim 13, wherein determining the position of the occupant within the area comprises:
 associating a position identifier with each location in the area that receives a light output from a light source of the luminaire;
 associating each position identifier with at least one pixel of the image;

determining a plurality of pixels of the image that corresponds to the occupant; and associating the position of the occupant within the area with the at least one light source of the luminaire based on the position identifiers of the plurality of pixels and position identifiers of each of the light sources of the luminaire.

15. The computer program product of claim 13, wherein adjusting the light intensity of at least one of the light sources of the luminaire further comprises:

identifying a light source of the luminaire to be adjusted based on the determined position of the occupant within the area and a position identifier associated with that position; and selecting a light intensity at which to operate the identified light source based on the direction that the occupant is facing relative to the luminaire.

16. The computer program product of claim 13, the process further comprising correcting at least one angular coordinate for a light source of the luminaire based on a position of an image capture device relative to the luminaire, wherein the image capture device captures the image of the area.

\* \* \* \* \*